United States Patent [19]
Menard

[11] 4,154,908
[45] May 15, 1979

[54] ELECTRODE CONFIGURATION FOR ALKALINE BATTERY SYSTEMS

[75] Inventor: Claude J. Menard, Schaumburg, Ill.

[73] Assignee: Gould Inc., Rolling Meadows, Ill.

[21] Appl. No.: 916,821

[22] Filed: Jun. 21, 1978

Related U.S. Application Data

[63] Continuation-in-part of Ser. No. 813,863, Jul. 8, 1977, abandoned.

[51] Int. Cl.² .......................................... H01M 10/28
[52] U.S. Cl. .................................. 429/206; 429/209; 429/223; 429/229
[58] Field of Search ........................ 429/206, 229–230, 429/231, 162, 223, 60, 209

[56] References Cited

U.S. PATENT DOCUMENTS

| | | | |
|---|---|---|---|
| 3,493,434 | 2/1970 | Goodkin | 429/231 |
| 3,790,409 | 2/1974 | Fletcher et al. | 429/231 X |

*Primary Examiner*—Anthony Skapars
*Attorney, Agent, or Firm*—Leydig, Voit, Osann, Mayer & Holt

[57] ABSTRACT

A secondary alkaline system, such as, for example, nickel-zinc, characterized by improved cycle life and superior volumetric energy density is provided in which the negative electrodes comprise a flat central portion with edges which have a greater amount of active material than does the central portion and positive electrodes having a flat central portion of substantially the same size as that of the negative electrode with edges having less active material than the central portion. In the preferred embodiment, the greater amount of active material at the edges is achieved in the negative electrodes by providing flared edges; and the lesser amount in the edges of the positive electrodes is obtained by forming the electrode with tapered edges.

14 Claims, 14 Drawing Figures

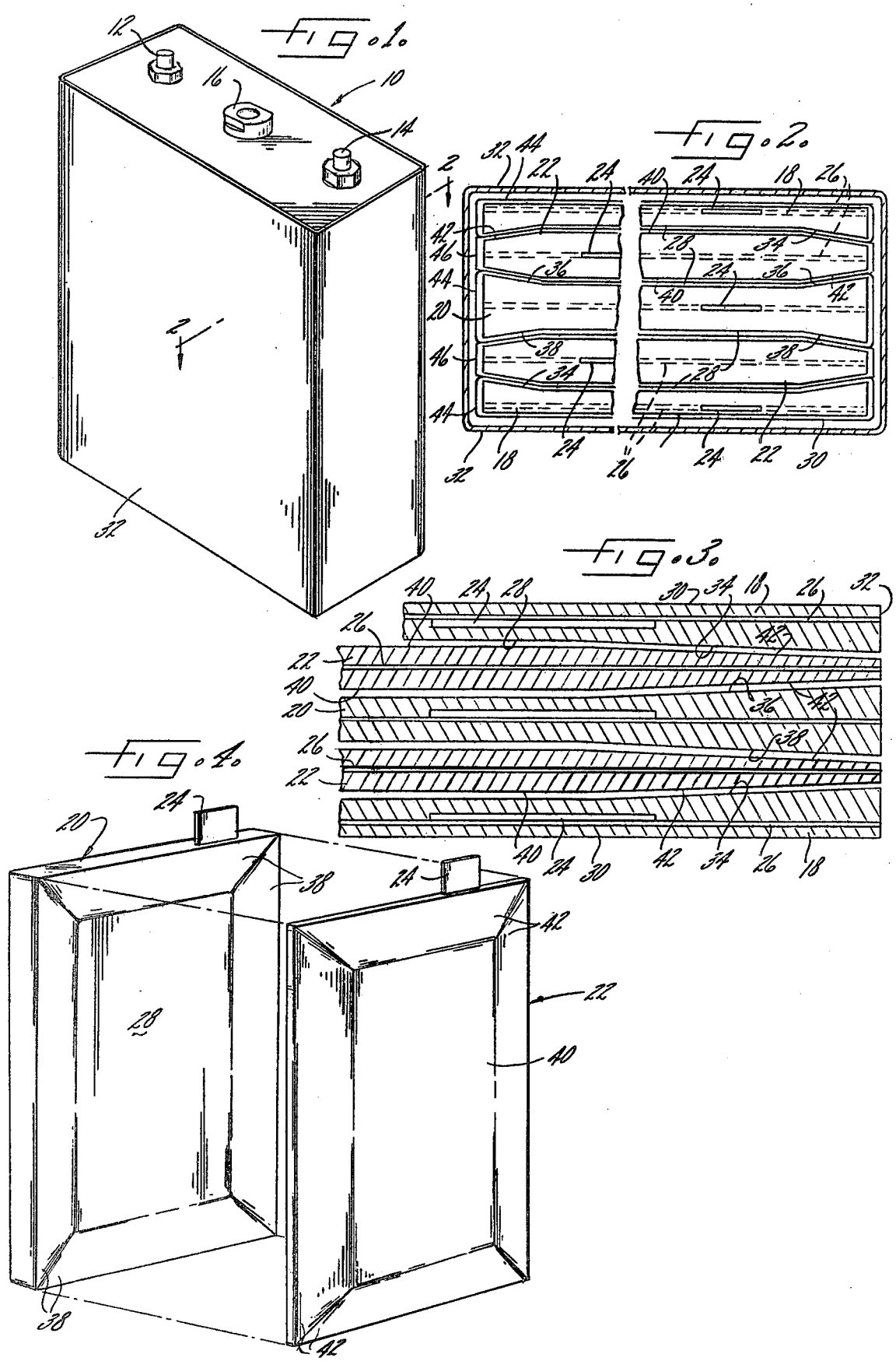

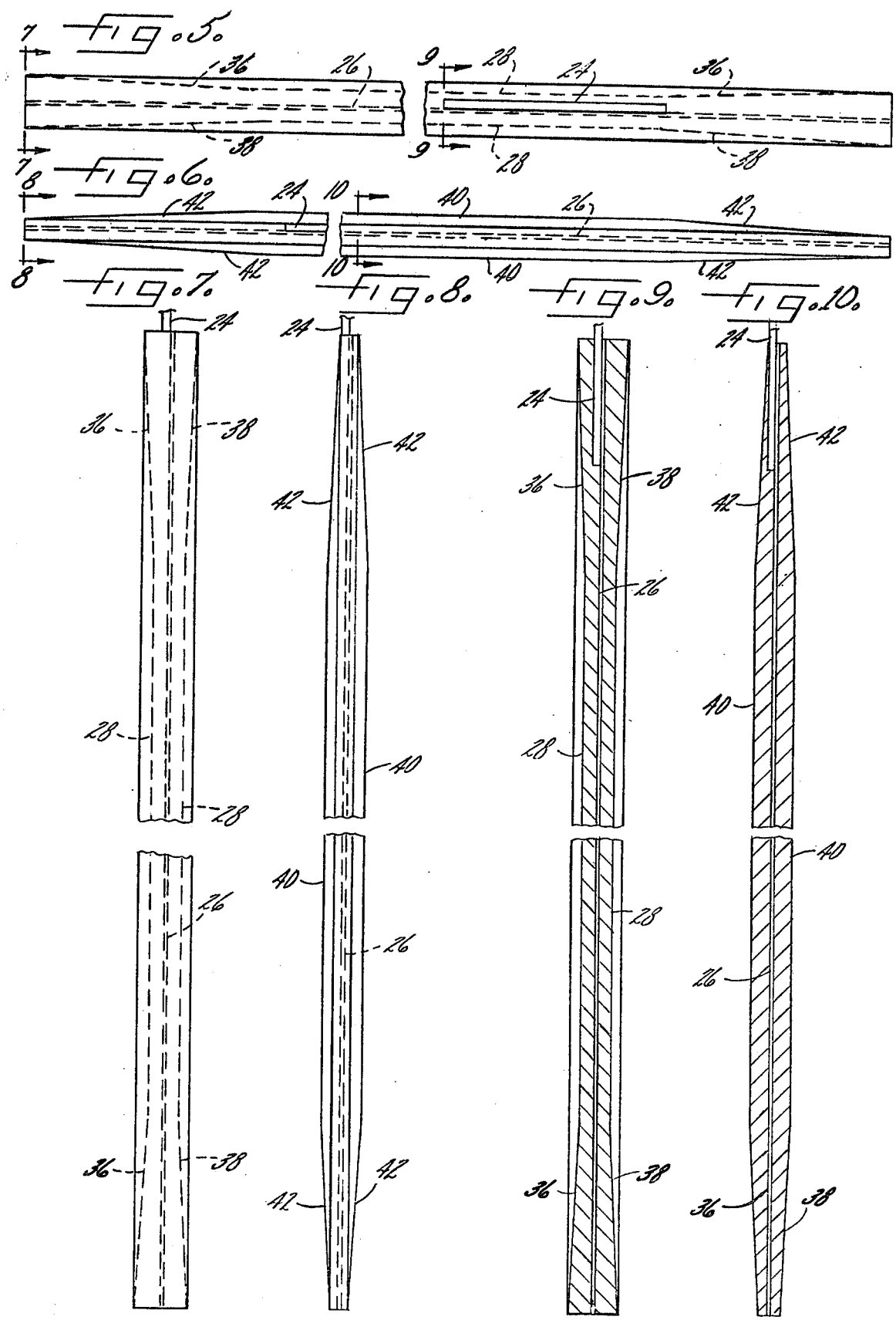

NOVEL ELECTRODE CONFIGURATION FOR ALKALINE BATTERY SYSTEMS

RELATED APPLICATION

Menard, Ser. No. 813,863, filed: July 8, 1977, now abandoned, for: Novel Electrode Configuration for Alkaline Battery Systems; the present application being a continuation-in-part thereof.

BACKGROUND OF THE INVENTION

This invention relates to secondary alkaline batteries and, more particularly, to shaped positive and negative electrodes for use therein.

Secondary alkaline batteries are particularly suited for a wide variety of applications ranging from power generation in air-borne systems to use in portable tools and appliances to engine starting and, importantly, to electric vehicle applications, due to the high energy densities which can be achieved. Typical electrode combinations include silver-zinc, silver-cadmium and nickel-zinc.

Nickel-zinc batteries have shown particularly outstanding potential. This potential has however not been commercially realized. Thus, the use of zinc electrodes in secondary batteries has been severely limited by their failure to withstand repeated cycling without an irreversible loss of capacity due to undesirable changes in the electrode structure which occur upon repeated recharge. The difficulty in achieving satisfactory cycle life becomes more pronounced for applications requiring relatively significant depths of discharge.

More particularly, in nickel-zinc battery systems using conventional aqueous solutions, such as potassium hydroxide, as an electrolyte, the zinc material, during discharge, is soluble in the electrolyte to a significant extent. Some of the active zinc material thus tends to enter the electrolyte while the battery system is being discharged and while the system stands in a discharged condition. Upon recharging of the battery system, these zinc species in the electrolyte return to the zinc electrode but not without altering the electrode structure. Typically, the active zinc material tends to migrate from the edges or periphery of the electrode structure and collects in the central regions of the electrode, resulting in an irreversible loss of capacity. It has been found that the zinc migration eventually ceases or at least reaches a plateau at which the migration rate is reduced to a minimal level; but, by the time this occurs, the loss in capacity which has resulted is substantial, often making further battery usage impractical. This phenomenon has been often termed "shape change".

A considerable amount of research has been directed to developing an understanding of the underlying reasons for this so-called "shape change". It has thus, for example, been theorized that the change in the electrode configuration is due to the development of concentration gradients of the soluble zincate ion in the commonly used electrolytes. Accordingly, it has been proposed to reduce the solubility of the zinc active material in the electrolyte by suitable modification of the electrolyte. Further proposed solutions have been directed to enclosing the electrodes in electrolyte-impermeable separators so as to isolate the electrodes from the supply of electrolyte that would normally be present along the edges, top and bottom of the zinc electrodes.

Still other solutions have been directed to providing zinc electrodes of greater strength. Thus, for example, the use of binders such as polytetrafluoroethylene and plastic latexes such as polystyrene, butadiene-styrene and polyvinylchloride have been suggested.

Other proposals have included the use of shaped zinc electrodes. For example, the use of an electrode tapered from a thick top edge to a thinner bottom edge has been suggested. Also, U.S. Pat. No. 3,493,434 to Goodkin discloses two types of shaped zinc electrodes. In one embodiment, the volume density of active material of the electrode varies because the volume upon which the density computation is made includes a depressed central region, i.e., the electrode thickness varies directly with the amount of active material per unit area. In a second embodiment, the actual electrode density of active material is varied and provided with a high density region adjacent the periphery of the electrode and a low density region away therefrom towards the center. In both embodiments, the shaped electrode configurations illustrated vary from a minimum amount of active material at the central region and progressively increases towards the periphery of the electrode, terminating at or adjacent the edges.

Despite all of this effort, the commercial potential of nickel-zinc batteries has simply not been realized. A considerable amount of research effort is however being carried out in an effort to provide batteries of this type which combine satisfactory cycle life without sacrificing the high energy densities that such systems are capable of providing. Stated another way, the solutions employed to counteract the "shape change" phenomenon have been at the expense of the energy densities that can be realized, with the resulting battery systems providing little incentive for commercial usage in view of the cost and performance characteristics achieved with other types of available battery systems.

It is accordingly a primary object of the present invention to provide electrode configurations for secondary alkaline battery systems which are capable of providing increased cycle life without any significant sacrifice in the energy densities realized.

A further and more specific object provides flat negative electrodes having flared edges suitably proportioned to compensate for shape change occurring during operation of the battery.

Yet another more specific object of the present invention lies in the provision of positive electrodes compatibly shaped for utilization with the flared edge negative electrodes to allow achievement of relatively high energy densities.

A still further object is to provide a secondary alkaline system capable of achieving increased cycle life by employing optimum ratios of active negative to positive material at selected areas of the electrodes.

Yet another object of this invention provides electrode configurations that minimize the possibility of separator rupture.

Other objects and advantages of the present invention will become apparent from the ensuing description and the accompanying drawings in which:

FIG. 1 is a perspective view of a cell utilizing the novel electrode configuration of the present invention;

FIG. 2 is a cross-sectional view taken substantially along lines 2—2 of FIG. 1 and showing the internal electrode configuration;

FIG. 3 is a fragmentary, enlarged cross-sectional view similar to FIG. 2 and further showing the shaped electrodes of this invention;

FIG. 4 is a perspective view and illustrates the central zinc electrode shown in FIG. 2 and a positive nickel electrode;

FIG. 5 is a top plan view of the zinc electrode shown in FIG. 4 and further showing the flared edges of this electrode;

FIG. 6 is a top plan view of the nickel electrode shown in FIG. 4 and further illustrating the tapered edges thereof;

FIG. 7 is a side elevation view of the zinc electrode shown in FIG. 5, viewed generally from the lines 7—7 of FIG. 5;

FIG. 8 is a side elevation view of the positive nickel electrode shown in FIG. 6, the view being generally along lines 8—8 of FIG. 6;

FIG. 9 is a cross-sectional view taken generally along lines 9—9 of FIG. 5 and further illustrating the flared edge configuration of the zinc electrodes of this invention;

FIG. 10 is a cross-sectional view taken generally along lines 10—10 of FIG. 6 and showing the tapered edges of the nickel electrode;

Figure 11:
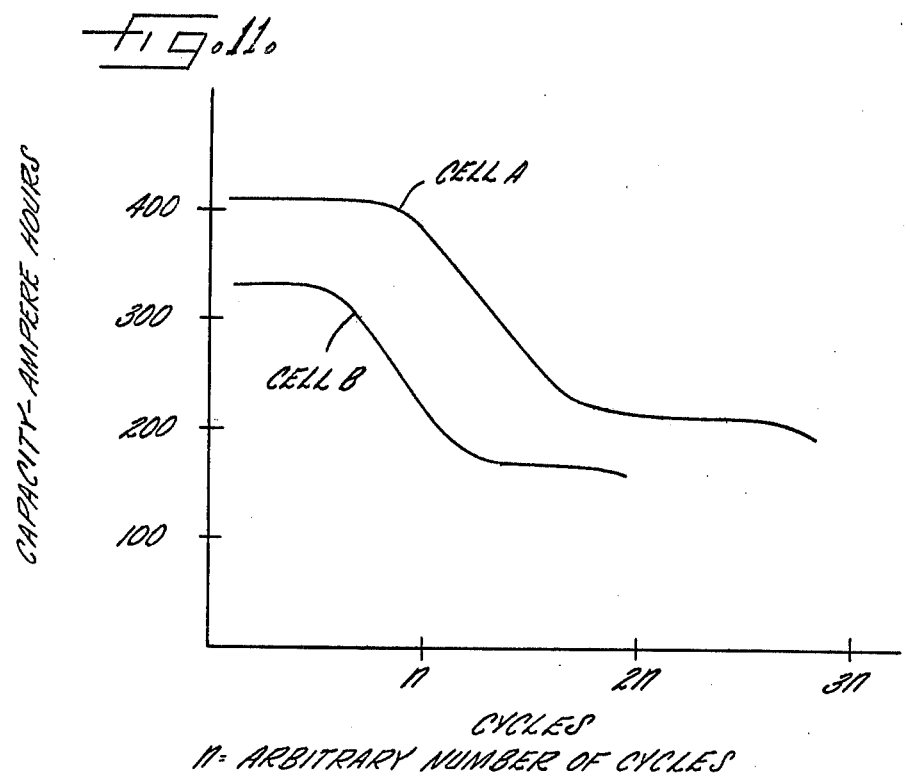
FIG. 11 is a graph of capacity vs. number of cycles and illustrating the improvement provided by a cell utilizing the electrode configuration of this invention in comparison to a cell using the prior Goodkin zinc electrode configuration.

While the invention is susceptible of various modifications and alternative forms, specific embodiments thereof have been described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims. Thus, for example, while the present invention will be principally described in connection with a nickel-zinc secondary rechargeable system, it should be appreciated that the present invention may likewise be employed with other electrode combinations. Thus, the novel configuration utilized for the zinc electrodes may be used to form electrodes from any other active material which, like zinc, is soluble in the electrolyte utilized in amounts sufficient to create a shape change problem. Likewise, for use as the positive electrodes, other materials than nickel could certainly be employed. Still further, the invention is equally applicable to either a single cell or to the use of a plurality of cells.

The present invention is, in general, predicated on the development of a positive and negative electrode configuration which allows the utilization of an increased ratio of negative to active material at the regions where electrode shape change of the negative electrodes occur and combine to provide increased cycle life yet, due to the compatibility of the electrode shapes employed, the energy densities achieved are not sacrificed to any significant extent. In a preferred embodiment, the increased ratio is achieved by employing flat negative electrodes having flared edges and flat positive electrodes with tapered edges uniformly spaced from the flared edges. The flared edges of the negative electrodes compensate for the shape change which will occur in operation, and the flat central portion combines with the shaped positive electrodes to maximize the energy densities achievable. In addition, the tapered edges of the positive electrodes serve to further enhance cycle life by allowing usage of even greater ratios of negative to positive active material in this region. The particular degree of tapering and flare of the respective electrodes are determined by the particular requirements of the intended applications as will be discussed herein.

Turning now to the drawings which show the preferred embodiment of this invention, FIG. 1 illustrates a cell 10 having a positive terminal 12, a negative terminal 14 and an electrolyte filler opening 16. As seen in FIGS. 2 and 3, the illustrative cell comprises two outer negative zinc electrodes 18 and a central zinc negative electrode 20 with two positive nickel electrodes 22 interposed between the zinc electrodes in alternating fashion. Each electrode includes a tab portion 24, allowing for electrical connection. As will be discussed in connection with the manufacture of the electrodes, the electrode structure comprises, in general, a grid supporting structure 26 upon which the active material is formed, as is conventional.

The outer zinc electrodes 18 as shown in FIGS. 2 and 3, comprise a flat central portion 28, a flat outer surface 30 adjacent the inside wall 32 of the cell 10 and an inwardly directed flared edge 34, adjacent the nickel electrodes 22. The central zinc electrode 20 is similarly shaped, as seen from FIGS. 2, 7 and 9, but includes flared edges 36 and 38 on both surfaces rather than on only the inside surface of the outer electrodes inasmuch as both surfaces are involved in the electrochemical reaction.

The tapered nickel electrodes 22, as seen in FIGS. 2, 8 and 10, consist of a flat central portion 40 and tapered edges 42. Because of the compatibility of the shapes of the positive and negative electrodes, this electrode configuration does not require significantly more width within the cell than would be involved when wholly flat electrodes are employed. While the positive electrodes are illustrated in the drawings as having lengths and widths essentially the same as the negative electrodes, it is of course well known that, in operation, the nickel positive electrodes will expand somewhat. This expansion can be minimized, depending upon the manner in which the electrodes are made as is also well known. It is accordingly within the scope of the present invention to form the nickel electrodes with smaller dimensions than the negative electrodes so that the expansion which takes place will ultimately result in the nickel electrodes assuming dimensions essentially the same as the negative electrodes.

As is well known, the replating or redeposition of zinc often occurs in the form of treed or branched crystals having sharp points (dendrites) which readily bridge the gap between the plates of opposite polarity, thereby causing short circuits and the destruction of the cell. Where dendrite formation is somewhat minimized because of extremely wide spacing between the plates or electrodes, the cell has an undesirably low power-tovolume or power-to-weight ratio, viz. — possesses low energy density. Accordingly, it is generally desirable to wrap a semipermeable membrane about the zinc and/or nickel electrodes. In the illustrative embodiment, the zinc electrodes are wrapped in a semipermeable separator material 44, and the positive nickel electrodes are wrapped in a semipermeable membrane 46.

The material used for the semipermeable membranes should suitably have relatively fine, uniformly sized pores and should allow electrolyte permeation therethrough while preventing dendrite penetration. Still further, the material employed should possess chemical stability in the battery or cell environment. Additionally, suitable materials should possess sufficient flexibility and strength characteristics to adequately endure the shape change and electrode expansion which will take place. A large number of materials have been proposed for use and are well known as are their methods of manufacture. It is thus suitable to use a flexible microporous film made from various organic materials. Alternatively, fine particles of various inorganic fillers such as, for example, alumina, silica or the like may be embedded in an organic substrate, providing a composite separator often termed an "inorganic/organic separator". Similarly, to satisfy the many diverse requirements involved, it may be useful to employ more than one layer of material or to employ more than one type.

The positive electrodes may be fabricated by utilizing well known techniques, and the specific method employed is not particularly critical insofar as the present invention is concerned. Thus, the use of both sintered and non-sintered type electrodes are known and may be utilized. In fabricating a nickel electrode of the sintered type, nickel powder and a suitable grid such as, for example, a thin perforated nickel foil are molded to the desired electrode substrate shape and then sintered to form a porous nickel plaque. As conventionally prepared, the plaques will typically have a porosity of about 80 to 85% or so.

The sintered, porous nickel plaques may then be impregnated with active material to form the electrodes by any of a variety of known techniques. For example, impregnation may be carried out by using a nickel nitrate solution, followed by cathodization in potassium hydroxide. Alternatively, $Ni(OH)_2$ may be electrochemically deposited in the pores of the plaque, employing a hot, concentrated solution of nickel nitrate hexahydrate at current densities generally between 50–150 milliamps per square centimeter.

More recently, non-sintered nickel electrodes have been developed for use in nickel-zinc cells. Typically, such electrodes are produced by blending $Ni(OH)_2$, graphite and a suitable binder with rolling or pressing the active material on a suitable grid supporting structure such as, for example, an expanded or woven nickel metal screen. In such a process, as is known, particular attention should be directed to selecting the proper particle size of the $Ni(OH)_2$ and graphite, percentage of graphite, the chemical stability of graphite and the concentration of binder. These parameters influence the electrode characteristics with regard to porosity, pore size, discharge rate capability and life.

Utilizing either procedure, to fabricate the novel nickel electrodes of the present invention, it is necessary to fabricate an electrode configured with a flat central portion and edge portions having less active material than the central portion. This can be accomplished, when using a porous sintered plaque for example, by providing a relatively flat electrode and then differentially providing less active material at the edges, as by fully impregnating the central portion with active material and then partially impregnating the edges.

It is, however, preferred to provide the lesser amount of active material at the edges by providing tapered edges. When a sintered electrode is being formed, the tapered edges can be provided by forming the base plaque with the tapered edges. With non-sintered electrodes, tapered edges can be obtained either by using a suitably shaped mold or by shaping the electrode after completion of molding. Most preferably, the nickel electrode is provided with its tapered edges by forming a sintered flat plaque and then, utilizing conventional coining techniques, tapering the edges. Thus, as is known, coining inherently decreases the porosity so that, when the active material is added to the coined nickel plaque, the decreased porosity will result in significantly less active material being obtained in the tapered edge portions. The desirability of this significantly reduced amount of active material will become apparent as the description proceeds.

The negative zinc electrodes may be made by conventional molding techniques. For example, zinc oxide powder may be blended with a polytetrafluoroethylene emulsion (or other suitable binder) to form a paste, which paste is spread on a surface such as a tray, dried and then sieved to the desired size. The desired amount of the binder-zinc oxide mixture is then placed into a mold having a cavity of the necessary shape, a grid (e.g. — a perforated nickel foil) is laid on the binder-zinc oxide mixture and a further layer of the binder-zinc oxide mixture placed over the grid. The mixture may then be compressed into the shape desired.

As has been discussed, the negative electrodes in accordance with this invention are provided with edge portions having more active material than the central portion. Preferably, this is achieved by forming the electrodes with a flat central portion and flared edges since the flared edges readily allow a maximum amount of active material to be located at the edges without unduly complicating the molding operation. Indeed, if necessary for the requirements of a particular application, the amount of active material could be further increased by molding the flared edges with a greater density of active material than is used for the central portion of the electrode.

Alternatively, substantially flat electrodes may be employed in which the edges have a greater density of active material than the flat central portion. This could be achieved by various means, among which is to first form a shape having flared edges and thereafter further compressing the edges to the thickness of the central portion, providing a decreasing density from the extreme edge to the innermost edge of the edge portion. Alternatively, other known molding techniques may be used to provide a uniform density throughout the edge portion. These embodiments will enhance the ratio of negative to positive active material at the edges so as to delay the loss in capacity resulting from shape change.

In accordance with the present invention, the particular configurations employed are determined by coordinating the various parameters which are necessary to provide the desired operating characteristics for the intended end use application. More particularly, for most applications, the requirements will entail providing a rated capacity (viz. — in terms of Amp-Hrs.) with at least a particular minimum volumetric energy density capable of undergoing at least 100, and sometimes substantially more, charge-discharge cycles at particular rates and depths of discharge. With these specific requirements in mind, the shaped electrodes of this invention can then be designed to their optimum configuration. Due to the preference for using tapered edge positive and flared edge negative electrodes, the design criteria for this embodiment will be described.

To this end, since the capacity of nickel-zinc cells are limited by the amount of the positive active material, the amount of active material which can be incorporated into the positive electrodes per unit area determines the thickness of the flat portion needed to provide the desired rated capacity. Also, of course, the configuration of the zinc negative electrodes to be employed must also be taken into account to allow development of the amount of active material that will be added in the tapered edges which are needed for compatibility with the zinc electrodes. This is particularly important when the tapered edges of the nickel electrodes are formed by coining, as the porosity will be typically decreased by up to 50% or even more of the initial porosity. The edge extremities of the tapered portions may suitably have thicknesses as low as about ½ the thickness of the central flat portion. The utilization of tapered edge portions with significantly thinner edge extremities becomes problematical, particularly where coining is employed since the substantially decreased porosity with such reduced thickness portions reduces the amount of active material that can be provided to an undesirably low level. Thus, a sufficient amount of active material should be present at the positive electrode edges to insure that the edge extremity enters into the electrochemical reaction, otherwise this portion will remain inactive and shape change on the negative electrode will be initiated internally from the edge extremity.

Since the zinc electrodes are somewhat less efficient, it is necessary that the amount of active material in the zinc electrodes be at least somewhat in excess of the stoichiometric amount and may be present in an excess of up to 50%, or even substantially more, over the stoichiometric amount dictated by the amount of positive active material present. Indeed, for many applications, ratios of up to 5:1 or more may desirably be used. The extent of the excess that should be employed will principally be determined by the discharge rates involved in the end use application contemplated. Thus, the higher the discharge rates, the more zinc active material that should be utilized. Accordingly, the thickness of the flat central portion of the zinc electrodes (viz. — with a given density of active material) will be determined in relation to the thickness of the nickel electrodes employed.

The extent of the flared edge portions of the zinc electrodes will, in general, be principally dependent upon the cycle life requirements of the application involved. It has been found desirable for most applications envisioned to provide flared edge portions having a thickness up to about twice that of the central flat portion. The extent of the flat central portion will generally comprise about 50% of the surface area and, in some situations, may comprise up to about 80%, preferably 50 to 70%, and, most preferably, 55 to 60%. In general, the less stringent the requirements of the end use application, the more flat area which can be tolerated. For this purpose, the percentage of the flat central portion is determined by the percent its length and width bears to the overall length and width of the electrode.

It should be appreciated that it is unnecessary for the flared extent to be uniform along all of the edges. Indeed, in a principal respect, the extent of the flare will depend upon the overall geometry of the electrodes. For example, with an electrode having approximately the same length and width dimensions, it will be satisfactory to have a uniform flare around all of the edges. However, as is often the case, the lengthwise dimension employed will be substantially longer than the dimension of the width. In such situations, the extent of the flare along the longer dimension may, if desired, be greater than along the shorter dimension since the potential loss of capacity is greater in the longer dimension.

It should also be appreciated that, as shown in FIG. 2, sufficient free space should be provided to allow for facile cell assembly, for the expansion of the nickel electrodes which occurs during operation and for the shape change of the zinc electrodes. Typically, at least 5% free space should be provided, some applications requiring even up to about 35% free space. As may be appreciated, free space in the higher portions of the range is more desirable with cells of relatively thin widths. This amount of free space provides sufficient space so that the replated zinc, which will build up in the flat central region of the zinc electrodes will not unduly increase the stress on the separator.

The present invention thus provides an electrode configuration in which the negative zinc electrodes have edges with sufficient excess zinc active material to compensate for the zinc migration which occurs during cell operation and has a central flat portion of relatively uniform thickness and which contains the requisite amount of active material for reaction with the positive active material for reaction with the positive active material to provide the desired cell capacity. In addition, the compatibly shaped positive nickel electrode allows a uniform spacing between the positive and negative electrodes with a compact electrode arrangement that achieves high energy density. Still further, the combination of the flared edges of the zinc electrodes and the tapered edges of the nickel electrodes allows an extremely high ratio in these regions of negative active material to positive active material to be achieved. This high ratio contributes substantially to the relatively long cycle life which can be obtained using the present invention. Thus, the amount of excess zinc active material in the flared edge portions is sufficiently great so that substantial amounts of zinc migration can be tolerated while still leaving sufficient zinc active material to react with the reduced amount of nickel active material present in the tapered edge portions.

A specific comparison of the preferred embodiment of this invention with the electrode structure of the previously cited Goodkin patent (the embodiment in which the thickness continuously decreases from the edge to the center) exemplifies the advantages which can be achieved. The exemplified cell included 10 nickel positive and 11 zinc negative electrodes, designed to provide a free space of 7.1% and employing multiple layers of separator materials positioned between adjacent electrodes and having a total thickness of 0.014 inch. Each cell had an average overall ratio of negative (theoretical)/positive (actual) active material of 5.46, and the negative zinc electrodes each had an average density of 27.55 Amp.-Hrs./in.$^3$. In the Goodkin cell, the total actual capacity would be 334 ampere hours and would be expected to decline to about 197 ampere hours after plateauing or cessation of shape change, which is 59% of the initial expected capacity. The peak or maximum volumetric energy density that could be achieved is 1.79 watt-hrs/in.$^3$.

In contrast, the combination of the flared edge zinc and tapered edge nickel electrodes of the present invention will provide a total capacity of 410 ampere hours, declining only to 271 ampere hours after shape change, about 66% of the initial capacity. In comparison to the Goodkin cell, the present invention provides about a 38% improvement in cell capacity after plateauing or cessation of shape change and a peak volumetric energy density of 2.20 watt-hrs./in.$^3$, also a substantial improvement over the Goodkin energy density. Moreover, the present invention will delay shape change, and the capacity diminution which results, for a significantly greater number of cycles than will the Goodkin structure, allowing achievement of a substantially greater useful cycle life. This is graphically illustrated in FIG. 11 in which the cell constructed in accordance with this invention is designated as Cell A and the Goodkin cell is Cell B. The curves shown were derived by mathematical calculations, using the cycle-capacity performance at a 5 hour discharge rate of a cell using conventional flat electrodes as a base point. As will be appreciated, after plateauing of shape change, some additional diminution of cell capacity occurs due to the increased current density which results.

Conceptually, it is believed that the unique combination of electrodes employed in accordance with this invention significantly delays the effects of shape change due to the extremely high ratio of negative/positive active material involved. The reduced amount of positive material in the tapered edges of the nickel electrodes requires less zinc active material to enter into the reaction. Moreover, and importantly, the flat central portions of the electrodes provide the ability to maximize the capacity in these portions so that the loss in capacity due to shape change becomes of less significance.

Figure 12:
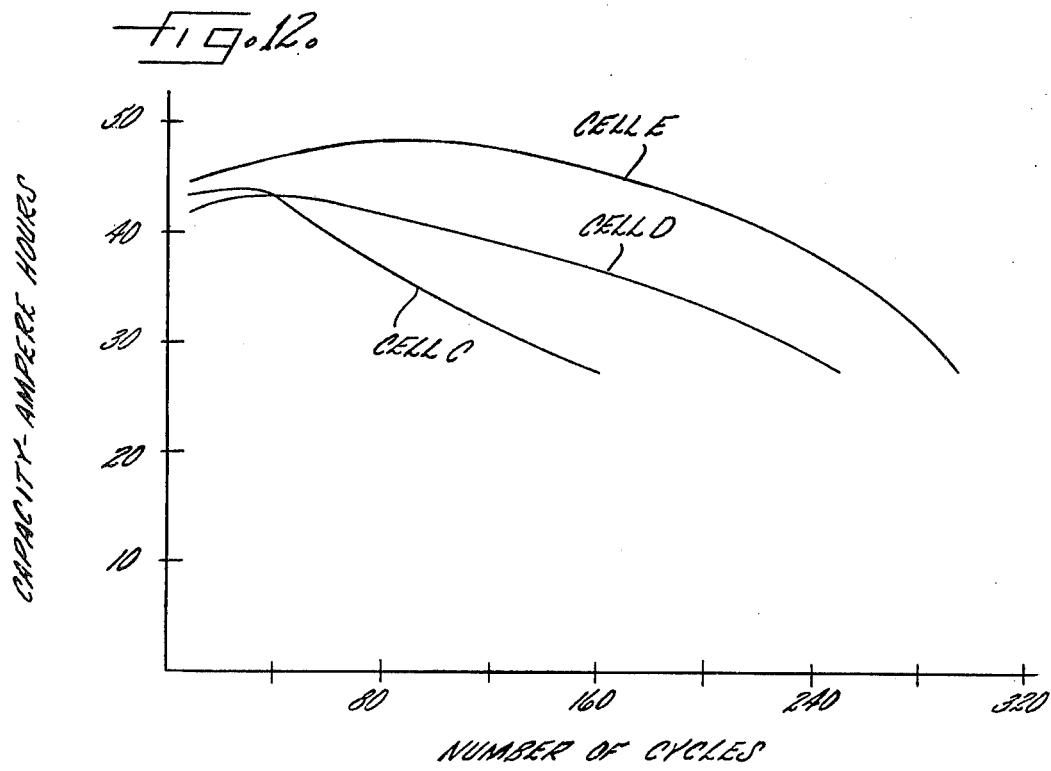
FIG. 12 is a graph similar to FIG. 11 and showing the performance of cells employing the preferred electrode configuration.
Figure 13:
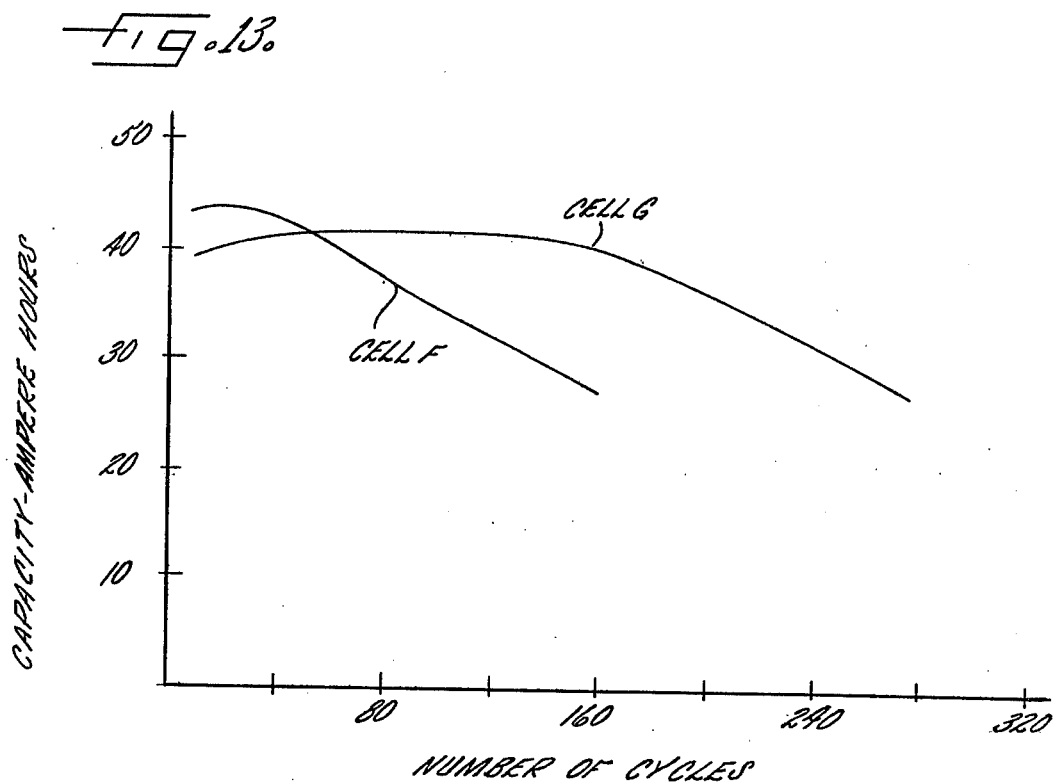
FIG. 13 is a graph similar to FIG. 11 and showing the performance of a cell using an alternative embodiment of this invention for the zinc electrodes.

The following Examples are intended to be merely illustrative of the use of the present invention and are not in limitation thereof. Thus, to provide a visual comparison, the performance of particular embodiments of the present invention are shown in the graphs of FIGS. 12 and 13, which Figures also include a cell not utilizing the novel electrode configuration of this invention. The various cells involved were constructed at different times, the cycling regimes used are not the same and certain other parameters that conceptually could affect any comparison are somewhat different.

For these reasons, no specific comparison between the performance of any cells shown should be made. It is, however, believed that the performance of cells utilizing the present invention will show improvements in performance, as can be seen from FIG. 11 and the previous discussion in the specification relative thereto.

EXAMPLE 1

This Example illustrates the use of the preferred embodiment of the present invention.

Tri-electrode, nickel-zinc cells (having 1 positive and 2 negative electrodes and assigned an arbitrary capacity of 40 Ampere Hours) were constructed and subjected to a series of charge-discharge cycles at different times, with the capacity achieved being determined and plotted vs. cycles (FIG. 12). Two cells (identified as Cells D and E in FIG. 12) having flared edge zinc and tapered edge nickel electrodes were constructed with different ratios of negative (theoretical)/positive (actual) active material. A cell (Cell C) using flat zinc and nickel electrodes was constructed and tested at a different time and is also shown in FIG. 12.

The negative electrodes used were prepared by blending zinc oxide powder with a polytetrafluoroethylene emulsion to form a paste. The paste was then spread on a tray and dried at elevated temperature. The dried mixture was then sieved, and a layer placed into the mold cavity. A grid was placed over the mixture and a second layer of the sieved, dried mixture added onto the grid. The mold was compressed to form an electrode of the desired shape, viz. — flat electrodes for Cell C and a flat electrode with one flat surface and the other having flared edges for Cells D and E.

The nickel electrodes used were of the sintered type and were prepared by sintering nickel powder onto a grid to form a porous plaque. The resulting plaques were then impregnated with active material, after first coining the plaques used in Cells D and E.

Other than Cell E, the negative electrodes in each cell were wrapped in a conventional "Visking" cellulose membrane (Union Carbide Corporation), and the positive electrodes were wrapped with a conventional non-woven nylon layer serving as an absorber, over which were wrapped two layers of a commercially available "Celgard" polypropylene film (Celanese Corp.) and an outer layer of "Visking" cellulose. Cell E used a "Celgard" polypropylene film — 3 layers of a microporous polyvinylchloride film as the separator system.

The specific details of each cell are set forth in Table I:

TABLE I

| Cell Details | Cell C | Cell D | Cell E |
|---|---|---|---|
| Total Ampere hours (theoretical) | 216 | 212 | 273 |
| Flared edge area of zinc electrodes (Amp.-Hrs.) | 98$^1$ | 113 | 145 |
| Flat central portion of zinc electrodes (Amp.-Hrs.) | 118$^2$ | 99 | 128 |
| Flared edge density of zinc electrodes (Amp.-Hrs./in.3) | 26.8$^1$ | 28.6 | 26.6 |
| Flat central portion density (Amp.-Hrs./in.3) | 26.8 | 26.1 | 24.7 |
| Overall negative (theoretical/ positive (actual) active material | 4.91 | 4.91 | 5.62 |
| Average negative edge portion (theoretical)/positive edge portion (actual) active material$^3$ | 5.44 | 7.64 | 8.79 |

$^1$Capacity or density of area equal to that of flared edge area of Cell D.
$^2$Capacity or density of area equal to that of flat central portion of Cell D.
$^3$Area of positive electrodes less than that of negative electrodes in each cell.

At the various times each of the cells was tested, an automatic cycling regime was employed after a number of cycles at essentially a 100% depth of discharge had been carried out. The various automatic cycling regimes employed did not involve discharges approaching 100% of the rated capacity (an arbitrary designation based on the capacity of the cell exhibited in the early cycling of the particular cell) of each cell. However, at periodic intervals that may have varied somewhat, each of the cells were taken off the automatic cycling regime for one day and were subjected to a 100% discharge, after each of two charges at two different rates. Automatic cycling was then resumed. The typical timing was to check about once a week.

The automatic cycling regimes used for cells C through E are set forth below:

Cell C

After 38 initial 100% discharge cycles, a regime including a 20 Amp. discharge for 1.1 hrs. (22 Amp.-Hrs. out), a 9 minute rest, and a 5.5 Amp. charge for 4.75 hrs. (26 Amp.-Hrs. in) was used.

After 59 total cycles, the same cycling regime was continued until cut-off, except that a 5 Amp. charge was used (23.8 Amp.-Hrs. in).

In each instance, 4 cycles/day were carried out.

Cell D

After 9 initial 100% discharge cycles, a cycling regime including a 20 Amp. discharge for 1.2 hrs. (24 Amp.-Hrs. out), a 9 minute rest and a 5.6 Amp. charge for 4.65 hrs. (26 Amp.-Hrs. in) was used.

4 cycles/day were carried out.

Cell E

After 7 initial 100% discharge cycles, 3 cycles/day were carried out as follows: a 10 Amp. discharge for 2 hrs. (20 Amp.-Hrs. out), a 6 minute rest and a 4 Amp. charge for 5.9 hrs. (23.6 Amp.-Hrs. in).

After 72 total cycles, 4 cycles/day were carried out as follows: a 20 Amp. discharge for 1.25 hrs. (25 Amp.-Hrs. out), a 6 minute rest, and a 6 Amp. charge for 4.65 hrs. (27.9 Amp.-Hrs. in).

After 147 total cycles, 3 cycles per day were carried out as follows: a 12.5 Amp. discharge for 2 hrs. (25 Amp.-Hrs. out), a 9 minute rest, and a 4.7 Amp. charge for 5.85 hrs. (27.5 Amp.-Hrs. in).

While no comparisons can be made for the reasons previously discussed, the performances exhibited are in the general trend that would be expected. Cell D, utilizing the novel electrode configuration of this invention, would be expected to have a longer cycle life than Cell C, having conventional flat electrodes. Moreover, since Cell E has a larger ratio of negative/positive active material than does Cell D, it would be expected that Cell E would have a longer useful cycle life.

EXAMPLE 2

This Example demonstrates the use of an alternative embodiment according to the present invention in which the zinc electrodes are flat but include edge portions having a greater density of active material than the central portion.

A nickel-zinc cell of the tri-electrode type was constructed as described in Example 1, except that the edge portions of the zinc electrodes were compressed to form electrodes of relatively uniform thickness. The specific details of the zinc electrodes are set forth in Table II, Cell F (same as Cell C of Example 1) being the cell having electrodes with the conventional electrode configuration and Cell G having the zinc densified edge electrodes.

TABLE II

| | Cell F | Cell G |
|---|---|---|
| Total Ampere Hours (theoretical) | 216 | 252 |
| Edge Portion, Amp.-Hrs. | 98 | 156 |
| Center Portion, Amp.-Hrs. | 118 | 96 |
| Edge Portion Density, zinc electrodes, Amp.-Hrs./in.$^3$ | 26.8 | 31.3 |
| Center Portion Density, zinc | | |

TABLE II-continued

| | Cell F | Cell G |
|---|---|---|
| electrodes, Amp.-Hrs./in.$^3$ | 26.8 | 16.0 |
| Negative (theoretical)/positive (actual) material - overall | 4.91 | 6.03 |
| Average Negative edge portion (theoretical)/positive edge portion (actual) active material | 5.44 | 10.99 |

FIG. 13 sets forth the cycling performance of Cells F and G. The cycling procedure described in Example 1 was used. For Cell G, the following 4 cycle/day automatic cycling regime was initiated after 6 100% discharge cycles: 20 Amp. discharge for 1.2 hrs. (24 Amp.-Hrs. out), a 9 minute rest and a 5.6 Amp. charge for 4.65 hrs. (26 Amp.-Hrs. in).

While no comparison can be made as noted herein, the cycle life performance of Cell G would be expected to approach or surpass that of Cell E in view of its larger negative/positive active material ratio at the edge portion. If Cell G would have been designed to provide the same total capacity as Cell E, it would be expected that Cell G would provide increased cycle life.

EXAMPLE 3

This Example sets forth the construction of a larger nickel-zinc cell (348 Amp.-Hrs. capacity based upon an average of cycles 4 through 7) in accordance with the preferred embodiment of this invention that would be generally of the size used for an electric vehicle application.

The cell was constructed as is generally described in Example 1, except that the electrodes were larger in dimension, and 8 positive and 9 negative electrodes were used. The performance characteristics of the cell are set forth in Table III at a 6-hour discharge rate:

TABLE III

| Discharge % of | Discharge Voltages for Various Cycles | | |
|---|---|---|---|
| Rated Capacity | 20 | 100 | 250 |
| 5 | 1.77 | 1.77 | 1.75 |
| 20 | 1.66 | 1.67 | 1.65 |
| 40 | 1.65 | 1.65 | 1.60 |
| 60 | 1.63 | 1.62 | 1.59 |
| 80 | 1.60 | 1.58 | 1.51 |

The general cycling procedure described in Example 1 was used. After 7 100% discharge cycles, the following automatic cycling regimes were used:

Cycles 8–54 (2/day)

Discharge at 100 Amps. for 2.25 hrs. (225 Amp.-Hrs. out), charge at 27 Amps. for 9.75 hrs. (263 Amp.-Hrs. in)

Cycles 55–83 (3/day)

Discharge at 125 Amps. for 1.6 hrs. (200 Amp.-Hrs. out), 35 Amp. charge for 6.4 hrs. (224 Amp.-Hrs. in)

Cycles 84–203 (3/day)

Discharge at 125 Amps. for 1.8 hrs. (225 Amp.-Hrs. out), 39 Amp. charge for 6.2 hrs. (242 Amp.-Hrs. in)

Cycles 204–211 (9 cycles/7 days)

Discharge at 55 Amps. for 4.35 hrs. (240 Amp.-Hrs. out), 21 Amp. charge for 13.15 hrs. (276 Amp.-Hrs. in)

Cycles 212–251 (2 cycles/day)

Discharge at 60 Amps. for 4 hrs. (240 Amp.-Hrs. out), 33 Amp. charge for 8 hrs. (264 Amp.-Hrs. in)

Cycles 252–270 (2 cycles/day)

Discharge at 90 Amps for 2 and 2/3 hrs. (240 Amps.-Hrs. out), 32 Amp. charge for 9⅓ hrs. (299 Amp.-Hrs. in)

Figure 14:
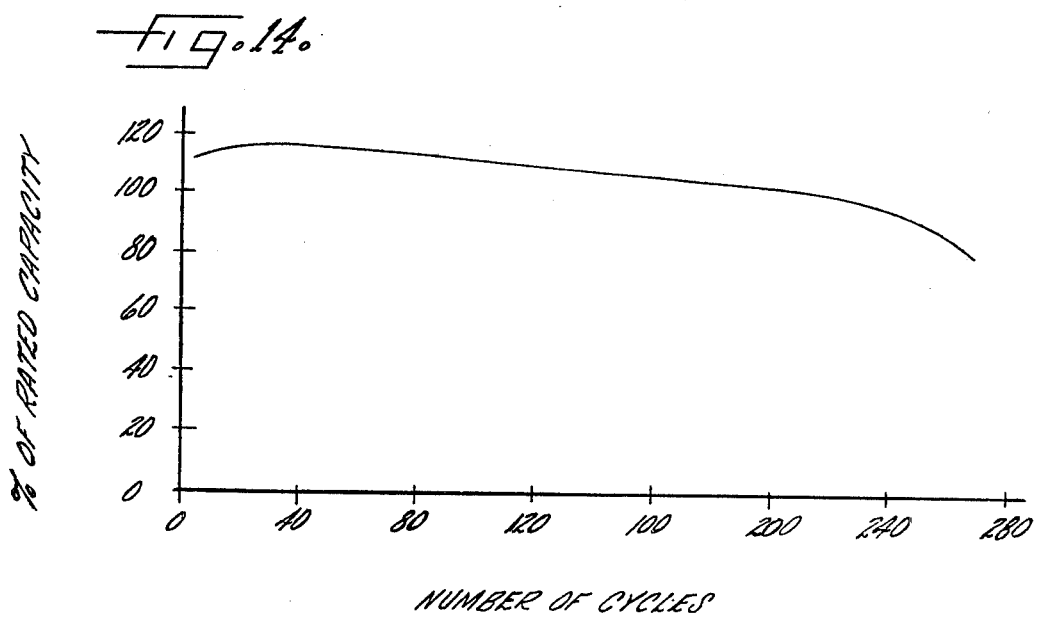
FIG. 14 is a graph of percent of rated capacity vs. number of cycles and illustrating the performance of a cell useful for an electric vehicle application which utilizes the novel electrode configuration of this invention.

As shown in FIG. 14, a cycle life of about 270 was achieved before the capacity was reduced to 80% of the rated (300 Amp.-Hrs.) capacity.

These Examples demonstrate the performance that can be achieved using the novel electrode configuration of the present invention providing the relatively high ratio of negative/positive active material. To achieve optimum performance, it is preferred to employ the uniquely configured positive and negative electrodes together. However, for some applications, satisfactory performance may be able to be achieved utilizing only one or the other. Thus, for example, the utilization of the novel tapered edge nickel electrodes of this invention even with conventional flat zinc electrodes of uniform density will provide improvement in performance in view of the increased ratio of negative/positive active material which will result at the electrode edges.

I claim:

1. In a secondary alkaline cell comprising a liquid alkaline electrolyte, at least one anode soluble in the electrolyte and at least one opposing cathode spaced from said anode, the improvement wherein said anode and cathode each comprise a flat central portion of substantially uniform thickness having a first predetermined amount of negative and positive active material, respectively, present in substantially uniform density, the length and width of said flat central portions being substantially equal, said anode and cathode each having integral edge portions surrounding their respective flat central portions, the integral edge portions of said anode having a greater amount and those of said cathode having a lesser amount of negative and positive active material, respectively, than said first predetermined amount and the spacing of at least said flat central portions being substantially uniform.

2. The secondary alkaline cell of claim 1 wherein said cathode is nickel and said anode is zinc.

3. The secondary alkaline cell of claim 1 wherein said anode is zinc.

4. The secondary alkaline cell of claim 1 wherein the integral edge portions of said anode flares from said flat central portion on at least one surface thereof, forming edge portions having a thickness greater than that of the flat central portion.

5. The secondary alkaline cell of claim 4 wherein the thickness at the extreme edge of said anode is up to about twice that of the flat central portion.

6. The secondary alkaline cell of claim 1 wherein the thickness of the integral edge portions of the anode is substantially the same as that of the flat central portion.

7. The secondary alkaline cell of claim 6 wherein the thickness of the integral edge portions of said cathode is substantially the same as that of the flat central portion.

8. The secondary alkaline cell of claim 1 wherein the thickness of the integral edge portions of said cathode is substantially the same as that of the flat central portion.

9. The secondary alkaline cell of claim 1 wherein the integral edge portion of said cathode tapers outwardly from said flat central portion to a thickness at the extreme edge less than that of the flat central portion.

10. The secondary alkaline cell of claim 9 wherein the thickness of the flat central portion of said cathode is up to about twice that of the extreme edge.

11. The secondary alkaline cell of claim 1 wherein the flat central portion comprises from about 50 to about 80 percent of the total area of the anode.

12. In a secondary nickel-zinc cell comprising at least one nickel cathode, at least one zinc anode spaced therefrom and a liquid alkaline electrolyte, the improvement wherein said anode comprises a flat central portion of substantially uniform thickness having a finite length and width and integral edge portions surrounding the edges of said flat central portion, said edge portions flaring from said flat central portion on at least one surface to form edges thicker than said central portion, said central portion being from about 50 to about 80 percent of the total area of said anode and said cathode comprises a flat central portion having a length and width substantially equal to those of said flat central portion of said anode and integral end portions tapering outwardly to the extreme edges of the cathode, the extent of the taper of said cathode matching the flare of the edge portions of said anode and providing a substantially uniform distance between the anode and cathode over the surface thereof.

13. In a secondary alkaline cell comprising a liquid alkaline electrolyte, at least one anode soluble in the electrolyte and of substantially uniform thickness and at least one cathode spaced from said anode, the improvement wherein said cathode comprises a flat central portion of substantially uniform thickness having a first predetermined amount of positive active material and integral edge portions surrounding said flat central portion and having a lesser amount of positive active material than said first predetermined amount and the spacing between at least said flat central portion and said anode being substantially uniform.

14. The secondary alkaline cell of claim 13 wherein the integral edge portions taper outwardly from said flat central portion to a thickness at the extreme edge less than that of the flat central portion.

* * * * *